Figure 1:
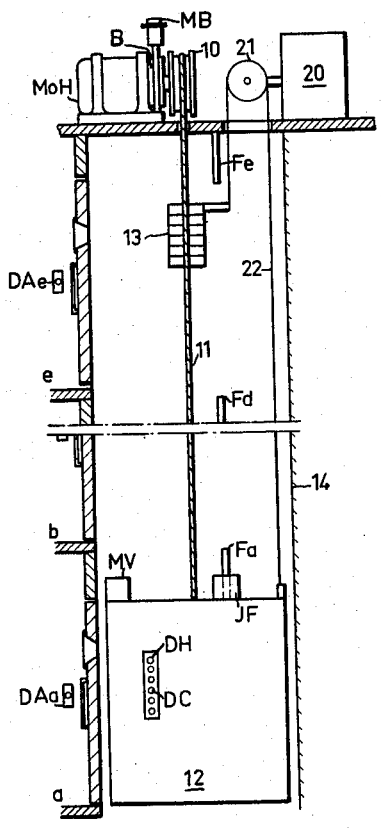

Sept. 1, 1964     H. BOSSHARD     3,146,857
ELEVATOR CONTROL SYSTEM
Filed Nov. 25, 1960                       7 Sheets-Sheet 1

Sept. 1, 1964  H. BOSSHARD  3,146,857
ELEVATOR CONTROL SYSTEM
Filed Nov. 25, 1960  7 Sheets-Sheet 4

Sept. 1, 1964 H. BOSSHARD 3,146,857
ELEVATOR CONTROL SYSTEM
Filed Nov. 25, 1960 7 Sheets-Sheet 5

United States Patent Office 3,146,857
Patented Sept. 1, 1964

3,146,857
ELEVATOR CONTROL SYSTEM
Hans Bosshard, Wurenlos, Aargau, Switzerland, assignor to Schweizerische Wagons- und Aufzügefabrik A.-G. Schlieren-Zurich, Schlieren, Switzerland
Filed Nov. 25, 1960, Ser. No. 71,571
Claims priority, application, Switzerland, Nov. 27, 1959, 81,174
3 Claims. (Cl. 187—29)

The present invention relates to an elevator control system having an analog control device.

The purpose of the control device is to indicate to the elevator control on the one hand, the position of the cabin in the elevator shaft and on the other hand to prepare with a determinated advance the braking for a predeterminated stop and to initiate this braking in cases of great elevator speed. Since, however, a great speed cannot be obtained between two or three stories with the usual distances between the stories it is necessary to provide intermediate speeds. The case may therefor occur that one and the same floor is approached at different speeds. Now, such different speeds require of course different accelerating and decelerating or braking distances. The dimension of these distances depends on the type of travel of the elevator, in other words, it depends on the values adjusted for the acceleration, the speed and the deceleration. Thereby it is well possible, that the braking paths overlap each other. It is necessary therefore to provide a device permitting the elevator, in accordance with the distance separating the position of the cabin and the end stop, to select the speed which is appropriate for the distance to be covered and, depending on the starting position of the cabin to determine the braking for the approach of the cabin.

There are several control devices known, providing by mechanical means a reproduction of the position of the cabin in the elevator shaft and of the necessary advance. These devices either require, if their precision is sufficient, a great mechanical and electrical expense or if the expense is minimized, there results an insufficient precision of the function. Thereby it is well known, that such mechanical and/or electrical control devices are voluminous and correspondingly heavy.

It is a prime object of the present invention to provide a control apparatus affording with mainly electrical means a sufficient precision of function in a small volume. To this end the control system according to the present invention is characterised by a floor discriminator adapted to compare a nominal voltage associated with each floor according to the level thereof with an actual voltage depending on the cabin position, whereby a control advance voltage depending on the type of travel is superposed on the actual and on the nominal voltages and the results of the comparison transformed into digital form to influence the elevator control.

An outstanding feature of the invention resides in the fact that for initiating the braking, a braking advance voltage is superposed on the actual voltage and that a braking discriminator compares the sum of the actual voltage and of the braking advance voltage with the nominal voltage of the end stop, whereby the result of this comparison, transformed into digital form, initiates the braking.

The arrangement may also be such that a speed discriminator compares an actual voltage corresponding to the speed of the cabin with nominal voltages adjusted in accordance with desired speed levels, whereby the result of the comparison, transformed into digital form, adds the control advances associated to the speeds.

Figure 2:
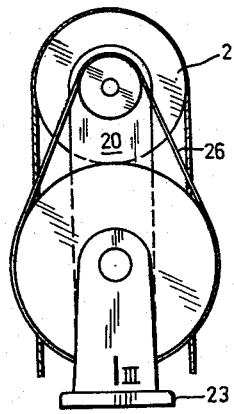
Figure 3:
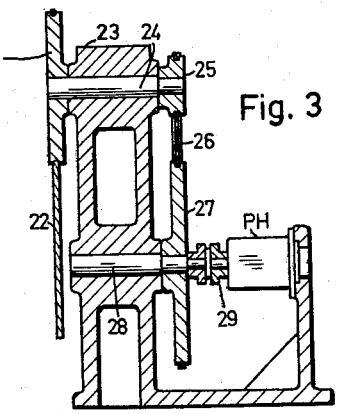
Figure 4:
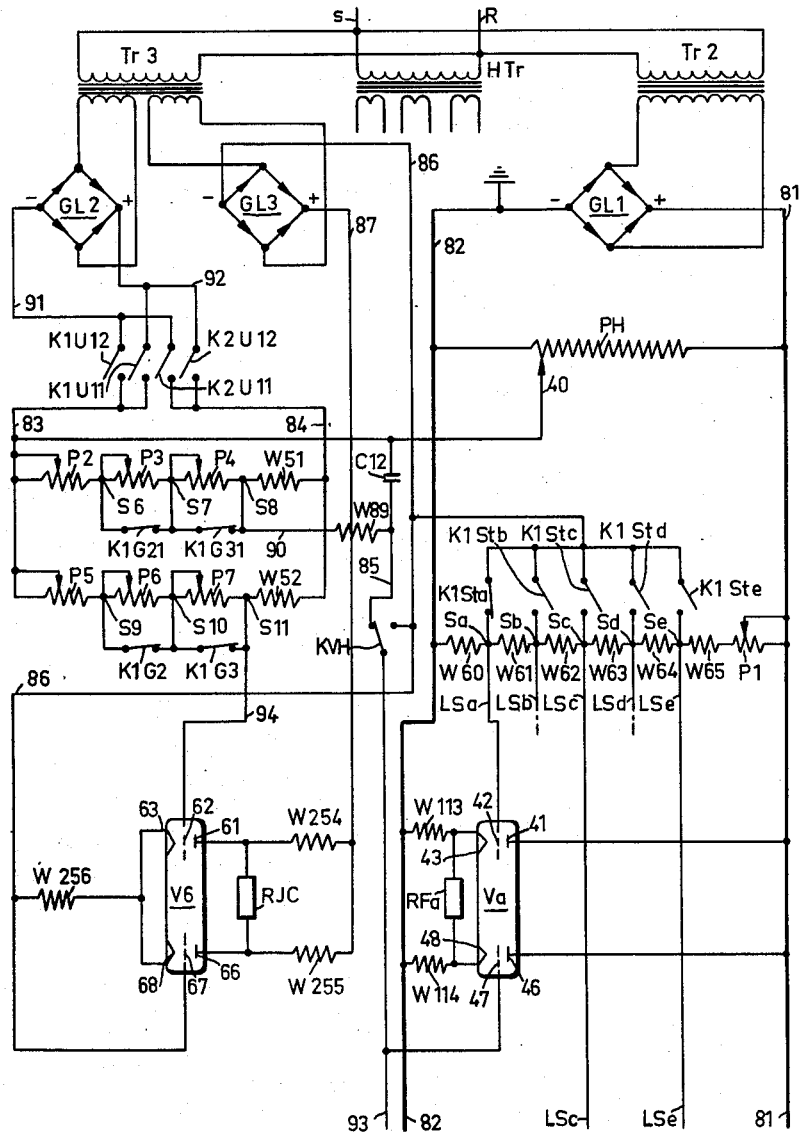
Figure 5:
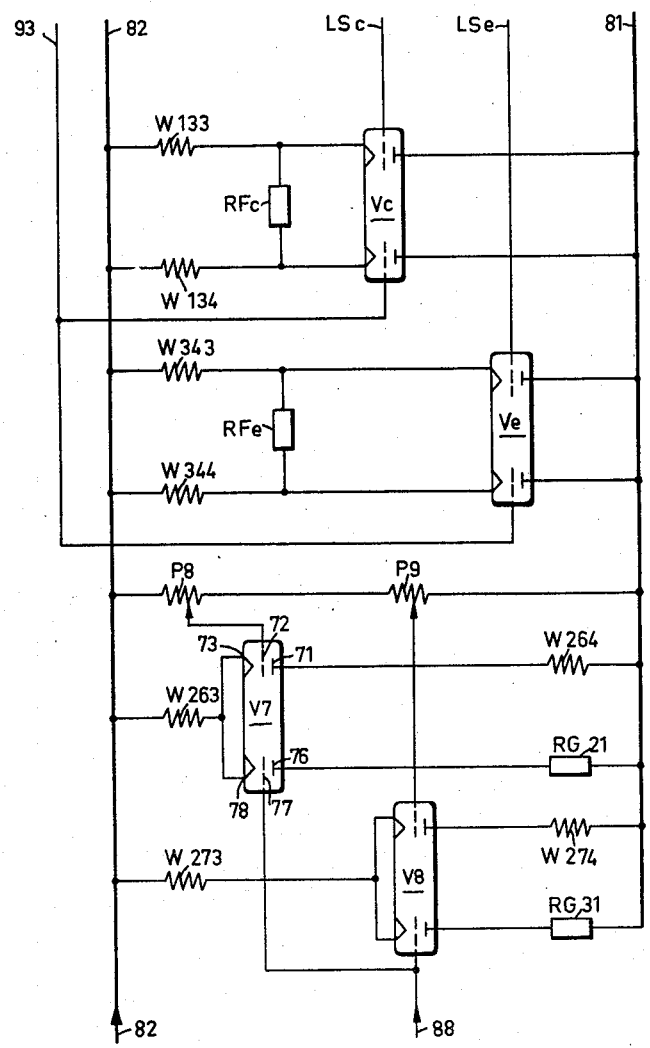

Other features and advantages of the invention will become apparent from the description now to follow, of preferred embodiments thereof, given by way of example only and in which reference will be made to the accompanying drawings in which:

FIGURE 1 illustrates an elevator system showing diagrammatically the driving device for a lifting potentiometer, FIGURE 2 is a view of the driving device of the lifting potentiometer, FIGURE 3 is a section taken along to the line III—III of FIGURE 2, FIGURES 4 and 5 show circuits of the control device, and FIGURES 6–9 illustrates circuits of the elevator control.

According to FIGURE 1, a D.C. motor MoH lodged in the machine room drives a driving disc 10 driving cables 11 carrying on the one side a cabin 12 and on the other side a counterweight 13. Between the motor MoH and the driving disc 10 there is arranged a brake B actuated by a braking magnet MB. The cabin 12 and the counterweight 13 slide in a shaft 14. This shaft 14 shows floors or stories $a$–$e$ by the elevator. For the sake of clarity, however, the floors $c$ and $d$ are not represented. Each floor has an outer call button DA. The cabin 12 is provided with push buttons DC and a stop button DH. The cabin 12 further carries a locking magnet MV for locking the shaft doors in a known manner over a movable slide acting on the locking contacts of the door locks. The cabin 12 further carries an induction switch JF influenced by lugs $Fa$–$Fe$ arranged in the shaft.

In the machine room there is further arranged a driving device 20 for a lifting potentiometer PH driven over a pulley 21 from a cable 22 secured to the cabin 12 and to the counterweight 13.

According to the FIGURES 2 and 3 the driving device 20 comprises a support 23 rotatably bearing a shaft 24. One end of this shaft 24 carries the pulley 21 and the other end of this shaft a small pulley 25 for a cone belt. A cone belt 26 connects the small pulley 25 with a larger pulley 27 also arranged rotatably in the support 23 by a shaft 28. A slider of the potentiometer PH, for example, a helical potentiometer, also secured to the support 23, is connected with shaft 28 via a coupling 29. The total length of the resistance of the potentiometer PH and the transmission ratio of the driving device 20 is selected in such manner that the voltage on the resistance may serve as an indication for the level of the cabin 12.

The FIGURES 4 and 5 show diagrammatically the structure of the control device. To the leads RS of a main RST (see FIG. 6) there are connected the primary windings of transformers $Tr2$, $Tr3$ and $HTr$. The secondary winding of the transformer $Tr2$ supplies a first rectifier GL1, the negative output of which acts upon a grounded lead 82 and the positive output of which acts onto a first lead 81. One secondary winding of the transformer TR3 supplies a third rectifier GL3 the outputs of which are connected with a lead 86 and with a lead 87. Another secondary winding of the transformer $Tr3$ supplies a second rectifier GL2 the outputs of which are connected with leads 91 and 92. Leads 91 and 92 are connected with a third lead 83 and with a fourth lead 84 over a contact arrangement responsive to the direction of travel and which shall be explained in more detail later on. The transformer $HTr$ serves as a heating transformer the secondary windings thereof heating in a known manner the cathodes of tubes mounted into the control device.

For effecting the control of the system four factors must be known, namely the actual value of the cabin position, a control advance for determining the following end stop and for preparing the braking, the nominal values of the floors and the braking advance for initiating the braking.

The potentiometer PH connected to the leads 82 and 81 has a slider 40 responsive to the cabin position. The signal appearing between the slider 40 and the second lead 82, in form of a D.C. voltage, corresponds to the actual value of the cabin position and acts onto the first lead 83.

Figure 7:
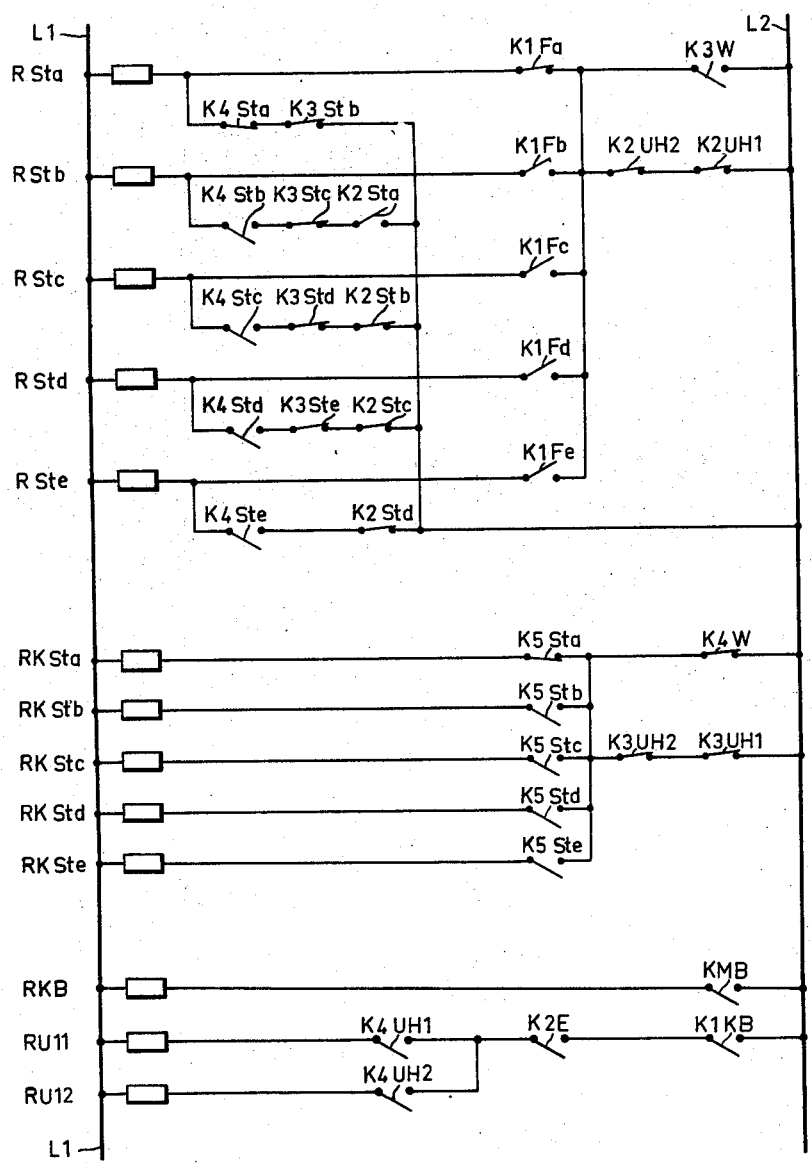

In order to prepare the braking and for determining the end stop a constant feed voltage is maintained between the leads 84 and 83 and the polarity of this feed voltage may be changed in response to the direction of travel via contacts K1U11 and K2U11 as well as K1U12 and K2U12 by relays RU11 and RU12 arranged in the control, FIG. 7. During the upward travel of cabin 12 (relay RU12 energized) the fourth lead 84 is positive and the third lead 83 is negative while at the downward travel (relay RU11 energized) the third lead 83 is positive and the fourth lead 84 negative. Between the leads 83 and 84 there is arranged a voltage divider for producing the control advance with three potentiometers P2, P3 and P4 and a resistance W51. The slider of potentiometer P2 is connected with the third lead 83 and the sliders of the potentiometers P3 and P4 respectively are connected to nodal points S6 and S7 respectively. The potentiometers P2, P3, P4 and the resistance W51 serve to produce the adjustable control advance voltages. Between the nodal points S6 and S7 there is connected a contact K1G21 and between the nodal point S7 and a similar point S8 there is arranged a contact K1G31 of two speed responsive relays RG21 and RG31 (hereinafter described) which short-circuit the second potentiometer P3 and the third potentiometer P4, respectively. With these contacts the different steps of the control advance are transmitted onto a lead 90 and from there decelerated by a resistance W89 and by a capacitor C12 and fed to a fifth lead 85. Between this fifth lead 85 and the second lead 82 there is thus formed a potential consisting of the actual voltage between the third lead 83 and the second lead 82, plus or minus, according to the travel direction, the control advance voltage designated hereafter by control advance, between the fifth lead 85 and the third lead 83. This potential is fed via change contact KVH of a relay RVH, described later, to a lead 93 is connected to all second grids 47 of twin-triodes Va to Ve. For the sake of clarity the twin-tirodes Vb and Vd have not been represented. These twin-triodes Va to Ve serve as floor responsive discriminator steps.

To each floor there is associated in the form of a direct voltage and in accordance with the level thereof a second reference value in order to provide the nominal values required for the control. These voltages are produced by a floor potential divider arranged between the leads 82 and 81 in the form of resistances W60 to W65 and of a potentiometer P1 whose slider is connected with the first lead 81. Nodal points Sa to Se of the voltage divider represent the floor level of the individual stops. The potential across resistance W61 is a reproduction of the lifting distance between the first and the second stop. The voltages across the resistances W62 to W64 have the same functions for the corresponding stops b to e. The resistances W60 and W65 result in that the lifting potentiometer PH must not be used up to the mechanical abutment. The potentiometer P1 serves to compensate eventual mechanical transmitting errors between the cabin 12 and the lifting potentiometer PH. The nodal points Sa to Se of the potential divider each have a lead LSa to LSe connected to a first grid 42 of the corresponding twin-triode Va to Ve. The anodes 41 and 46 of the twin-triode Va are directly connected to the first lead 81. A cathode 43 is connected via a resistance W113 to the second lead 82. A further cathode 48 is also connected with the second lead 82 via a resistance W114. A relay RFa is mounted between the two cathodes 43 and 48. If the voltages between the first grid 42 and the second grid 47 are different, relay RFa is energized and if the grid potentials are the same the relay RFa is released. Analogously the twin-triodes Vb to Ve associated to the corresponding floors cooperate with the corresponding relays RFb–RFe.

Figure 8:
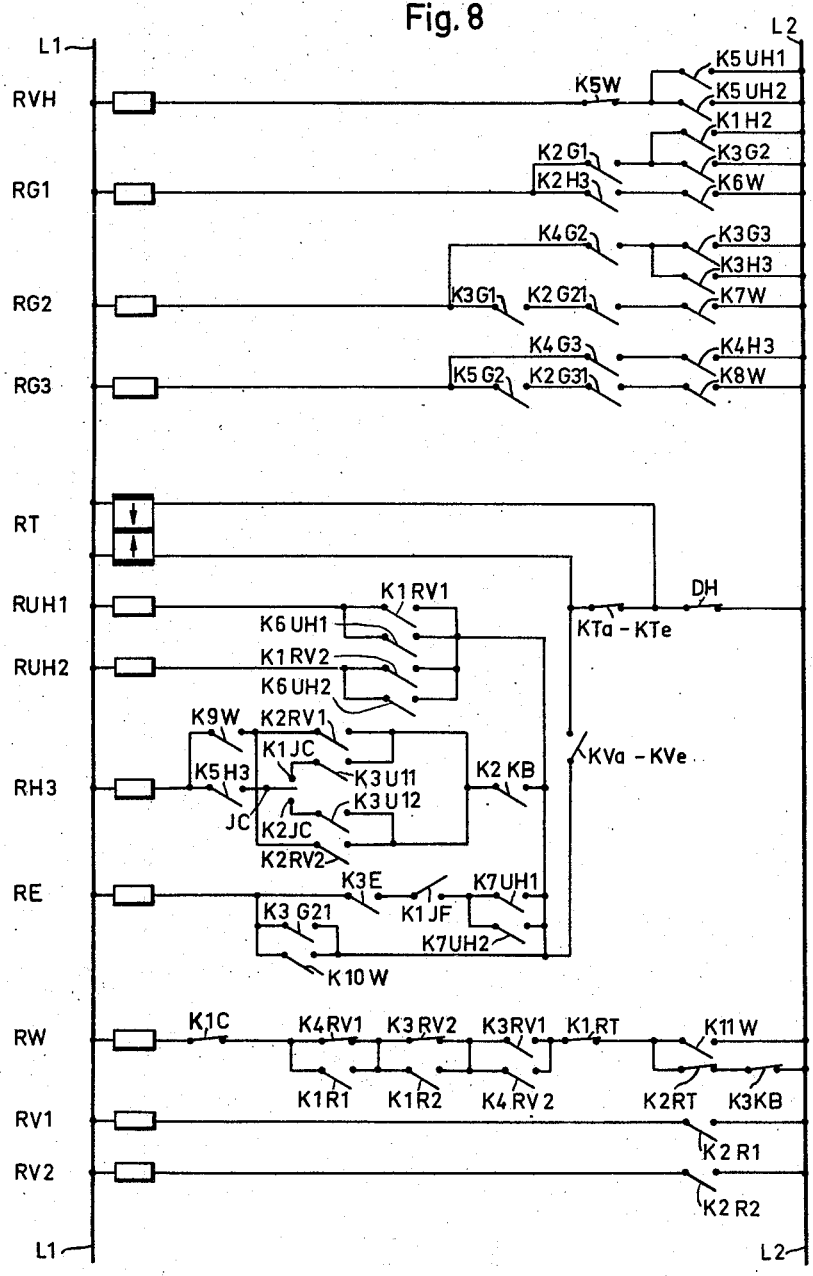

The voltage for initiating the braking starts from the constant feed potential between the leads 84 and 83 to which is connected a potential divider for producing the braking advances. This potential divider consists of potentiometers P5, P6, P7 and of a resistance W52. The slider of potentiometer P5 leads to the third lead 83 and the sliders of the potentiometers P6 and P7 lead to nodal points S9 and S10 respectively. Further connected across the nodal points S9 and S10 is a contact K1G2 and across the nodal point S10 as well as to the nodal point S11 is a contact K1G3 of two speed responsive relays RG1 and RG2 for short-circuiting the second and the third potentiometers P6 and P7, respectively. By means of the potentiometers P5, P6, P7, the resistance W52 and of the contacts K1G2, K1G3, the different voltage degrees of the braking advance are fed onto a lead 94 connected with the nodal point S11. Between the lead 94 and the second lead 82 there is thus produced a potential consisting of the actual voltage between the leads 83 and 82 plus or minus, according to the travel direction, the braking advance voltage hereafter designated by braking advance between the leads 94 and 83. This potential directly acts upon a second grid 62 of a twin-triode V6 serving as a braking discriminator. Cathodes 63 and 68 of the twin-triode V6 are connected together and to the sixth lead 86 via a resistance W256. The sixth lead 86 connected to D.C. current source GL3 leads over a row of contacts operated by the control and comprising the contacts K1Sta to K1Ste onto the floor voltage divider comprising the resistances W60 to W65. By means of measures in the control which shall be explained in more detail later on, care is taken that only one contact of the contact row is closed whereby only the contact of the end stop is active for the control. In this condition for operation it is the sixth lead 86 which carries the nominal voltage of the end stop. A first grid 67 is connected with the sixth lead 86. One anode 61 leads over a resistance W254 and the anode 66 over a resistance W255 to the seventh lead 87. A polarized relay RJC having a change contact JC (FIG. 8) is switched between the two anodes 61 and 66. If the voltage between grid 62 and the sixth lead 86 (FIG. 4) is negative the contact point JC is connected with a contact K2JC (FIG. 8). This means that as long as the sum of the actual voltage and of the braking advance voltage is smaller than the nominal voltage of the end stop the contact K2JC is connected with the contact point JC. If this added voltage equals the nominal voltage the contact point JC is associated with no contact. If this added voltage is greater than the nominal voltage, the contact point JC will be connected with a contact K1JC.

In the represented control embodiment the control advance and the braking advance are added to the actual voltage. But of course these advances could also be supplied to the nominal side. Since, however, a separate nominal value is required for each floor, the control advances would in this case have to be fed directly onto the leads LSa to LSe which would require larger expenses.

Further digital information about the state of speed of the cabin is necessary. This information is supplied by the speed discriminator. The present embodiment has two speed steps consisting of twin-triodes V7, V8 and relays RG21 and RG31 (FIG. 5). A second grid 77 of twin-triode V7 associated with one step is connected to an eighth lead 88. Lead 88 together with the second lead 82 are connected reverse contacts K3U1, K4U1 and K3U2, K4U2 respectively (FIG. 6), of two travel direction responsive relays RU1 and RU2 in the control to an armature circuit supplying the actual voltage to motor MoH. The connection is such that the eighth lead 88 independently from the direction of travel always has a positive voltage whose magnitude depends on the speed of the elevator. Between the leads 81 and 82 there are mounted potentiometers P8 and P9 by means of which the desired speed levels may be adjusted. The slider of the potentiometer P8 is connected with a first grid 72 of the twin-triode V7 and supplies to the latter an adjustable positive nominal voltage. Cathodes 73 and 78 of the twin-triode V7 are connected together via a resistance W263 to the second lead 82. An anode 71 leads over a resistance W264, and another anode 76 leads over a relay RG21 to the first lead 81. As long as the actual voltage at the grid 77 is smaller than the positive nominal voltage at grid 72 the relay RG21 is released. If the actual voltage at the grid 77 is larger than the positive nominal voltage at grid 72, the relay RG21 will be energized. The other speed step which includes a twin-triode V8, relay RG31 and the switching elements associated thereto operates analogously but at a higher speed level.

Figure 6:
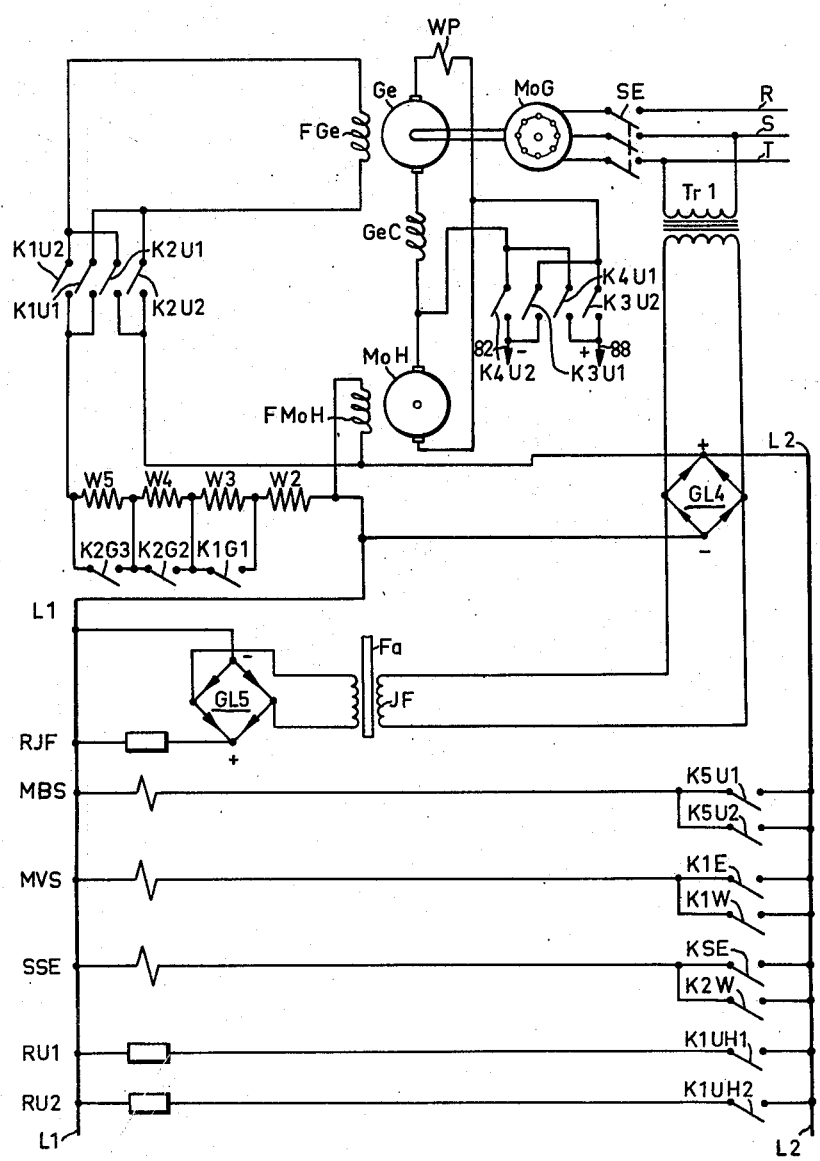

According to FIGURE 6 a driving motor MoG of a Ward-Leonard system is supplied from the mains RST via a three-pole-contactor SE. Further, the primary winding of a transformer Tr1 is connected with the leads S and P while the secondary winding of this transformer is fed to a fourth rectifier GL4. The outputs of the rectifier GL4 supply the leads L1 and L2. The motor MoG drives a generator Ge. A reverse pole WP is arranged in series with the armature circuit of the generator Ge and a similar arrangement is provided for the armature winding of the motor MoH and for a compound winding GeC. A field winding FMoH of the lifting motor MoH is connected to the leads L1 and L2. Lead L1 is fed furthermore via resistances W2, W3, W4, W5 of a further contact arrangement, contacts K1U1, K2U1 and K1U2, K2U2 respectively of the relays RU1, RU2 and a field winding FGe of generator Ge to lead L2.

The resistances W3, W4 and W5 are short-circuited by control contacts K1G1, K2G2 and K2G3 of corresponding relays RG1, RG2 and RG3. The described Ward-Leonard drive is of well known construction so that a more detailed description of its operation may be dispensed with.

Figure 9:
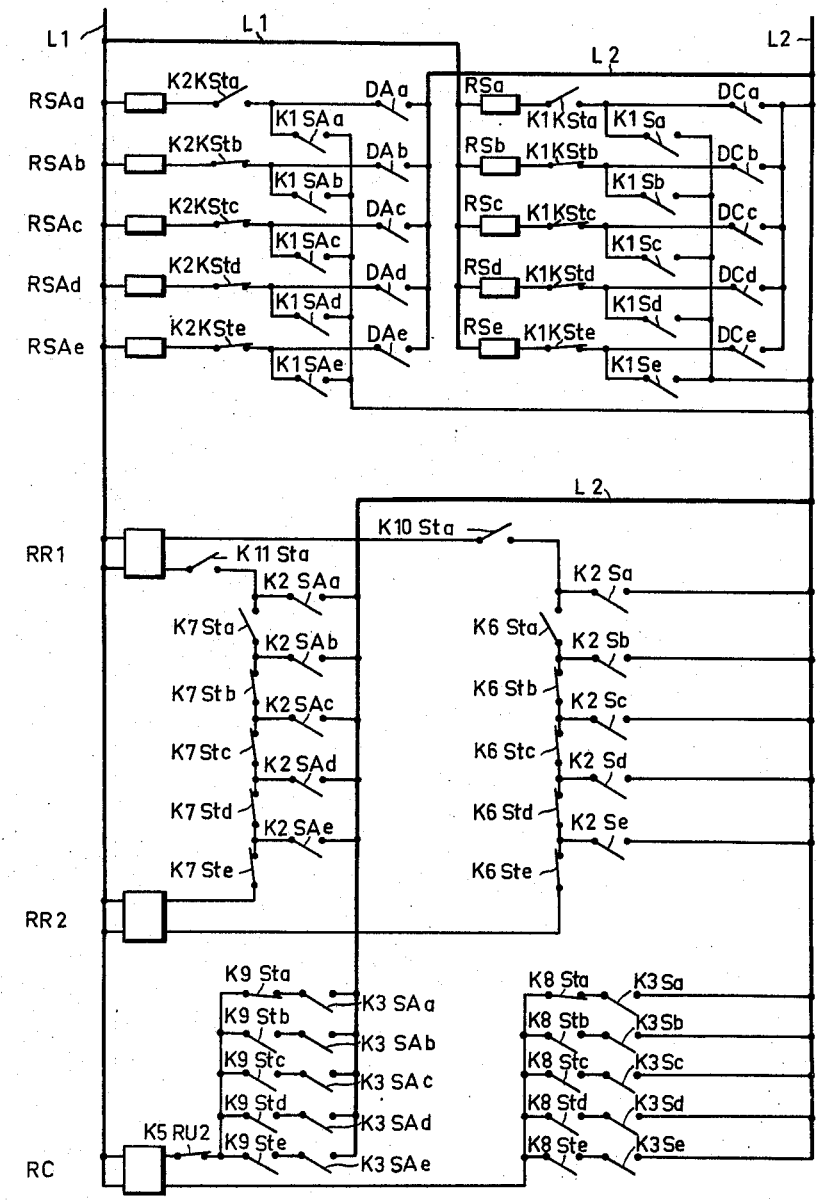

The actual elevator control consists of the further portion of FIGURE 6 and of the FIGURES 7-9. The connection thereof shall be explained in more detail hereafter. The leads L1 and L2 serve as supply points to the elements of the elevator control.

A coil MBS of the braking magnet MB is energized through the contacts K5U1 and K5U2 of the relays RU1 and RU2. A coil MVS of the locking magnet MV is supplied over contacts K1W and K1E. In the control, the most important relays are designated as follows:

RU1 ⎫
RUH1 ⎪ Travel direction responsive relays
RU11 ⎬ for downward travel.
RV1 ⎭

RU2 ⎫
RUH2 ⎪ Travel direction responsive relays
RU12 ⎬ for upward travel.
RV2 ⎭

RSta to RSte _____ Position relay of the control device.
RKSta to RKSte __ Auxiliary relay of the control device for the passage barrage.
RKB _____ Braking relay.
RT _____ Door relay.
RH3 _____ Acceleration and deceleration relay.
RE _____ Fine adjustment relay.
RW _____ Travel continuation relay.
RG1 to RG3 _____ Speed determining relays.
RSa to RSe _____ Floor relays for cabin call.
RSAa to RSAe ___ Floor relays for outside or hall calls.
RR1 _____ Direction relay with a double-winding for downward travel.
RR2 _____ Direction relay with a double-winding for downward travel.
RC _____ Collecting relay with a double-winding.
RJF _____ Relay of the induction switch.
RVH _____ Holding relay for floor discriminator.

The contacts associated with the relays are designated by K, i.e. the first letter R of the relay designation is replaced by letter K. The contacts which do not depend from relays are designated as follows:

KSE _____ Auxiliary contact at contactor SE.
DH _____ Contact of the stop button.
KTa to KTe _____ Door contacts.
KVa to KVe _____ Locking contacts.
KMB _____ Contact at the braking magnet.
DCa to DCe ____ Push buttons in the cabin.
DAa to DAe ____ Push buttons on the floors.

*Position of the Control With the Cabin at Rest*

The represented control embodiment is based on a position of the cabin at floor a, i.e. the cabin 12 is at rest at floor a. The lugs F (FIG. 1) mounted in the elevator shaft 14 are adjusted in such manner that each lug F associated with a floor is in the air gap of the induction switch JF when the cabin stands still at the corresponding floor. Accordingly, the magetic flux in the secondary winding of the induction switch JF is so small that a very small curent only flows over a fifth rectifier GL5 (FIG. 6) and the relay RJF is released.

In the mentioned rest position of the cabin the slider 40 of potentiometer PH (FIGS. 3 and 4) is in its lowermost postion. Thus the actual voltage has the value corresponding to the floor a. The control advance as well as the braking advance are nil since the travel direction responsive contact K1U11, K1U12, K2U11 and K2U12 are opened. In this position of the cabin, the actual value corresponds to the nominal value appearing over the resistance W60 and in lead LSa respectively. The actual voltage is received from slider 40 via the third lead 83, potentiometer P2, the contacts K1G21, K1G31, the lead 90, the resistance W89 and the contact KVH unchanged to the lead 93. The twin-triode Va has at the first grid 42 the nominal voltage of the lead LSa and at the second grid 47 the actual voltage of lead 93. Since both of these voltages are equal, the voltages across the resistances W113 and W114 are also equal so that the coil of the relay RFa is not energized and the rest contact K1Fa thereof is closed. Since the leads LSb–LSe, which are connected at the corresponding first grid of the twin-triodes Vb to Ve have a voltage higher than the actual voltage at the second grids the relays RFb to RFe are energized and correspondingly their contacts K1Fb to K1Fe are opened (FIG. 7). As the contact K1Fa is closed the relay RSta is supplied over contacts K2UH1–K2UH2–K1Fa and is self-holding via contacts K4Sta to K3Stb. Accordingly, one contact K5Sta is closed and the relay RKSta is energized over a contact K4W and the contact K5Sta. In this operating condition the control advance voltage is zero so that the control device serves to determinate the cabin position, i.e. the analog position indication of the cabin is transformed into the corresponding digital information for the control. The braking discriminator does not act on the control and no other relays of the latter are released.

*First Travel Example*

It is assumed that the control receives a travel order over the push button Dab (FIG. 1) The relay RSAb (FIG. 3) is energized via a contact K2KStb and becomes self-holding via a contact K1SAb. A contact K2SAb is closed and energizes from lead L2 via the contact chain K7S*tb*–K7S*te* the travel direction relay RR2. Over a contact K2R2 relay RV2 is energized (FIG. 8). Since all doors and thus all door contacts KT*a*–KT*e* are closed the differential relay RT is released. Over contacts K3KB–K2RT–K1RT–K4RV2–K1S2–K4RV1 – K1C the relay RW is energized and becomes self-holding via a contact K11W. A contact K2W is closed and energizes the contactor coil SSE so that the contacts of the contactor SE are closed and the motor M*o*G with the generator G*e* starts to rotate (FIG. 6). The contactor SE remains self-holding over the auxiliary contact KSE. The coil MVS of the locking magnet MV is energized via contact K1W and locks the door of floor *a*. Thus all locking contacts KV*a*–KV*e* (FIG. 8) are closed and relay RUH2 is supplied via contacts DH–KT*a* to KT*e*–KV*a* to KV*e*–K1RV2. Thus relay RU2 is energized via a contact K1UH2 (FIG. 8), the coil MBS of the braking magnet MB is energized via contact K5U2 and the brake B (FIG. 1) is released. As the locking contact chain KV*a*–KV*e* is closed the relay RE (FIG. 8) is supplied via a contact K10W. The control contact KMB of the braking magnet MB energizes the relay RKB. Thereby a contact K2KB is closed and relay RH3 is energized via contact K2RV2–K9W. By the already mentioned energization of relay RU2 the contacts K1U2 and K2U2 are closed, the field winding FG*e* of generator G*e* (FIG. 6) is energized and the elevator starts to move. By the energization of relay RH3 (FIG. 8) a contact K2H3 is closed and the relay RG1 is energized via a contact K6W. Thereby the contact K1G1 is closed, resulting in a short-circuiting of resistance W3 (FIG. 6) and the elevator accelerates towards its first speed step.

Over a further contact K1KB of relay RKB and over a contact H2E and a contact K4UH2 the relay RU12 is energized (FIG. 7) and the contacts K1U12 and K2U12 are closed, thereby resulting in the production of a positive voltage between the leads 84 and 83 (FIG. 4). Due to the voltage division between the resistance W51 and the potentiometer P2 which is effected directly over the closed contacts K1G21 and K1G31 the control advance belonging to the first speed step is produced between the leads 83 and 90. This control advance depends on the running characteristics of the elevator in the sense that the control advance corresponds to the sum of the accelerating and decelerating distance of the corresponding speed step. Both of these distances are transformed into a voltage and correspondingly adjusted by the potentiometer P2.

From lead 90 the control advance is fed to the leads 85 and 93 respectively via resistance W89. The transmission is slowed by capacitor C12. The purpose of this slowing is to constantly advance the control advance in order to provide the elevator control with the necessary reaction time for actuating the relays. Between the leads 82 and 93 there is thus active a voltage consisting of the actual voltage depending on the cabin position and of the control advance voltage which in the described case of upward travel is added to the actual value. Accordingly, the voltage at the second grid 47 of the twin-triode V*a* increases and becomes higher than that of the first grid 42 resulting in an energization of the relay RF*a*. Since the reproduction of the control advance of the first speed step must be smaller than the smallest distance between two adjacent floors the potential value at the second grid of the twin-triode V*b* does not attain the potential value at the first grid until the voltage of the momentary cabin position together with the control advance voltage is equal to the nominal voltage at the end stop *b*. As soon as these voltages at both grids of the twin-triode V*b* have become equal relay RF*b* is released. Before the grid voltages at the twin-triode V*b* are equalized the voltages at the grids of the twin-triode V*a* become unequal resulting in an energization of the relay RF*a* and thus in an opening of contact H1F*a*. The release of relay RF*b* produces energization of relay RS*tb* (FIG. 7) via contacts K3W–K1F*b* and the release of relay RS*ta* through the interrupting contact K3S*tb*. The relay RS*tb* becomes self-holding over the contacts K4S*tb*–K3S*tb*–K2S*ta*. Thereby the marking member indicating the end stop *b*, i.e. the relay RS*tb* is energized.

In the meantime the elevator has continued to accelerate and the speed thereof has increased resulting in an increase of the armature voltage. Thus the positive voltage at the eighth lead 88 (FIG. 5) has increased to such an extent that it has become greater than the nominal voltage adjusted at potentiometer P8 so that the first step of the speed discriminator with the relay RG21 becomes responsive. This results in an opening of contact K1G21, the control advance of the second step is switched-in and transmitted in the manner already described to lead 93. According to the running characteristics of the elevator the relay RF*c* may still release and close contact K1F*c*. Such closure, however, has no effect since during upward travel contact K2UH2 is open and since contact K3W is already open again as will appear from the following. By the determination of the end stop in the control no influence is possible anymore from the side of the floor discrimination.

In order to prepare the braking, contact K7S*tb* releases the energized relay RS*tb* (FIG. 7) and since no other calls are present relay RR2 is released (FIG. 9). Thereby contact K1R2 is opened, relay RW (FIG. 8) releases and its self-holding contact K11W is opened. Simultaneously contact K2R2 is opened and relay RV2 released. As in this moment, it is clear in the control that only one floor distance has to be covered and that therefore the first speed step will not be exceeded, energization of relay RG2 as will be described hereafter must be prevented. The contacts K7W and K3G1 in the circuit of relay RG2, immediately before the release of relay RW were closed. It may be that the speed limit adjusted at the potentiometer P8 has already been attained by the elevator so that relay RG21 is energized and a contact K2G21 is closed*w*. Thereby relay RG1 is energized. The deceleration in relay RG2 is selected in such manner that relay RW is released previously so that relay RG2 may not again become active due to the re-opening of contact K7W. Such a deceleration may easily be obtained with well known mechanical or electrical decelerating means.

The release of relay RW closes a contact K5W and relay RVH is energized since during upward travel a contact K5UH1 of the upward travel relay RUH1 is closed. Thereby the contact KVH (FIG. 4) is switched and now connects the sixth lead 86 with lead 93, so that the nominal voltage of the end stop *b* may act on lead 93 via contact H1S*td*. Accordingly, the floor discriminator is no longer under the influence of the cabin position and of the control advance, but is maintained at the end stop *b* over relay RF*b* and a contact K1F*b* respectively and over relay RS*tb* and its contact K1S*tb* at the floor voltage divider.

Simultaneously with the control advance and in an analagous manner the braking advance has been produced between the leads 94 and 83 by means of the voltage divider for the braking advance consisting of resistance W52, the contacts K1G2, K1G3 and the potentiometer P5. The braking advance is adjusted by potentiometer P5 in accordance with the stopping distance corresponding to the first speed step. As soon as relay RS*tb* is energized the contact K1S*tb* is closed, so that the sixth lead 86 has with respect to the second lead 82 the nominal voltage of the end stop *b*. Since the voltage between the leads 94 and 82 consisting of the actual value of the cabin position and the braking advance is less than the nominal value of the end stop *b* the voltage between the grids 62 and 67 of the twin-triode V6 is negative, so that at the polarized relay RJC contact K2JC is connected with the contact point JC. At the moment when contact K9W is opened, the relay RH3 (FIG. 8) becomes self-holding over the contacts K3U12–K2JC–K5H3 thereby completing the preparation of the braking.

The initiation of the braking is effected as soon as the cabin has approached within the stopping distance to the end stop $b$, i.e. as soon as the sum of the actual voltage and of the braking advance is equal to the nominal voltage of the end stop $b$. The potential of the two grids 62 and 67 of the twin-triode V6 at this moment an equal so that the polarized relay RJC returns into the zero position and the contact K2JC is opened whereby relay RH3 is released. Thereby, the contact K2H3 is opened and the mechanically decelerated relay RG1 (FIG. 8) is released leading to an opening of contact K1G1. In consequence thereof, the resistance W3 (FIG. 6) becomes active and reduces the current in the generator field FG$e$ so that the elevator is decelerated to the entrance speed which is determined by means of the energizing current through the resistances W2 to W5.

Shortly before attaining the entrance speed the first step of the speed discriminator switches under the following action: Upon acceleration of the elevator the relay RG21 of the first speed step was energized as already described. As soon as the speed and consequently the actual voltage of the speed drops below the voltage adjusted at potentiometer P8 the relay RG21 is released and opens the contact K3G21 whereby the relay RE is prepared for the release, i.e. only the self-holding over a contact K3E is active. The contact K10W has already opened when the braking was prepared.

The elevator now continues with the entrance speed until the induction switch JF (FIG. 1) attains the lug F$b$. Then relay RJF is released, a contact K1JF is opened and the relay RE is released. The contact K1E is opened and interrupts the locking magnet MVS (FIG. 6) after the contact K1W has opened already at the preparation of the braking. The door in floor $b$ is unlocked, the locking contact KV$b$ is opened and relay RUH2 is released (FIG. 8). Consequently, contact K1UH2 and relay RU2 no longer receive current. The opening of contact K5U2 closes the brake B. As the cabin stands still in floor $b$ the control has again reached its rest position except for the drive motor M$o$H which continuous to run. More particularly by opening the contacts K1U12 the control advance has again become zero so that only the relay RF$b$ of the end stop is released while all other relays RF$a$, RF$c$–RF$e$ are energized.

Second Travel Example

It is assumed that a passenger enters the cabin in floor $b$ and wants to travel to floor $d$, i.e. a travel over two stories. By actuating the push button DC$d$ relay RS$d$ (FIG. 9) is energized via a contact K1KS$td$ and become self-holding via a contact K1S$d$. Over contact K2S$d$–K6S$td$–K6S$te$ relay RR2 is energized. The further sequence of the control functions until the relay RS$tc$ is energized corresponds to that described with reference to the first travel example. As relay RS$tc$ is energized a contact K6S$tc$ in the circuit of relay RR2 is opened and the contact K6S$td$ is closed. The relay RR2 remains energized as it is supplied over contacts K2S$d$–K6S$td$–K6S$te$. Consequently, the acceleration to the second speed step may continue. In contradistinction to the first travel example relay RR2 and with it relay RW remain energized for a time long enough to permit relay RT2 to be energized.

In the meantime and as mentioned before, relay RG21 was energized and switches-in the control advance for the second speed step through contact K1G21. The second control advancee arrives as described for the first advance onto lead 93 and provokes energization of relay RF$c$ bringing relay RR$d$ near to release. As the elevator continues its travel, relay RR$d$ is released completely and closes contact K1F$d$ producing the marking member of the end stop $d$, i.e. relay RS$td$ to be energized and relay RS$tc$ to be released through opening of a contact K3S$td$. Through the interruption of contact K6S$td$ the relay RR2 is released so that contact K1R2 is opened and relay RW becomes currentless. This leads to the opening of its self-holding contact K11W. Simultaneously, the contact K2R2 is opened and relay RV2 is released. The release of relay RW further produces an opening of a contact K8W in the circuit of relay RG3, which on the one hand prevents a further increase of the speed and on the other hand initiates the preparation of the braking in the already described manner.

Upon further acceleration up to the nominal speed of the second speed step the second step of the speed discriminator already switches with relay RG31. However, the associated increases of the control advance initiated by the opening of contact K1G31 (FIG. 4) remains uneffective as in the circuit of the relays RS$ta$ to RS$te$ the contact K3W has already opened while contact K2UH2 remains open during the whole travel.

In accordance with the higher speed, the braking must be initiated earlier and is effected by the opening of contact K1G2 which may be adjusted in accordance with the the running characteristics of the elevator by means of the second potentiometer P6. As soon as the elevator has approached the end stop $d$ to a distance corresponding to the stopping distance, the braking is initiated by the opening of the contact H2JC in the circuit of the relay RH3 (FIG. 5). Consequently, relay RH3 is released and through the opening of a contact H$r$K3 the relay RG2 is brought to decelerated release and reduces through the opening of contact K2G2 over the added resistance W4 the energizing current in the field winding FG$e$ and consequently the speed (FIG. 6). As a contact K3G2 is opened the coil of relay RG1 becomes currentless causing decelerated release. The further operation of the braking corresponds to that already described in connection with the first travel example.

Third Travel Example

In order to explain an example of travel with three speed steps it is assumed that the passenger enters the elevator at floor $d$ and actuates the push button DC$a$. Through button, DC$a$, relay RS$a$ (FIG. 9) is energized via a closed contact K1KS$ta$ and becomes self-holding over a contact K1S$a$. Relay RR1 is energized via contacts K2S$a$ and K10S$ta$. As described for the first travel sequence, the travel direction responsive relays RR1, RV1, RUH1, RU1 and RU11 for the downward travel are actuated. The acceleration of the elevator is effected as described for the first and for the second example. In reversed sequence the further operation of the control function is effected up to the energization of relay RS$tb$. Following this a contact KS6$tb$ in the circuit of relay RR1 is opened and a contact K6S$tc$ is closed. The relay RR1 remains energized as it is supplied over the contacts K2S$a$ and K10S$ta$. Consequently the acceleration may continue to the third speed step. In contradistinction to the second travel example, relay RR1 and consequently relay RW remain energized long enough to permit relay RG3 to be energized.

In the meantime and as described in connection with the second travel example, the relay RG31 was energized and switches through contact K1G31 the control advance for the third speed step. This third control advance produces energization of relay RF$b$ and brings relay RF$a$ near to release. As the elevator continues relay RF$a$ is completely released and closes contact K1F$a$ leading to energization of the marking member of the end stop $a$, i.e. the relay RS$ta$ is energized and relay RS$td$ is released since its self-holding is interrupted through contact K11W. Simultaneously, a contact K2R1 is opened and relay RV1 becomes currentless. Through the opening of contact K9W, the release of relay RH3 is prepared. Since contact K1G3 was already opened during the accelerating phase the braking advance for the switching of the third potentiometer P7 in the potential divider for the braking advance was adapted to the highest speed, whereby by adjusting the third potentiometer P7 the travel condition of the elevator may be taken into consideration. As soon as the elevator has approached the end stop *a* to a distance corresponding to the braking distance, the braking is initiated by the opening of contact K1JC. Accordingly, relay RH3 is released and relay RG3 is brought to decelerated release by the opening of a contact H4H3. Through the opening of contact K2G3, the resistance W5 is added and the energizing current in the field winding FG*e* is reduced and reduces the speed. By the opening of a contact K3G3, the coil of relay RG2 becomes currentless leading to decelerated release thereof. The further braking corresponds to that already described for the second travel example.

In brief the acceleration for a travel with highest speed is effected as follows: With the energization of relay RKB the preparation of the travel by the control is completed. On the one hand, contact K1KB energizes relay RU12 and over the contacts K1U12 and K2U12 the control advance produced by the potential division between the resistance W51 and the potentiometer P2 is superimposed on the actual voltage of the cabin position. On the other hand, contact K2KB energizes relay RH3 which in turn through contact K2H3 energizes relay RG1 and produces acceleration of the elevator to the first speed step. Simultaneously with the control advance, the braking advance associated with the first speed step, produced by the potential division between resistance W52 and potentiometer P5 becomes active.

After a short time of acceleration, the speed level determinated by potentiometer P8 is attained and relay RG21 is energized. This causes the opening of contact K1G21 so that the control advance associated with the second speed step and produced by the potential division between resistance W51 and the potentiometers P3 and P2 is continuously decelerated by means of the resistance W89 and capacitor C12 is superimposed on the actual voltage of the cabin position. By the application of this control advance the floor discriminator is advanced in the direction of travel resulting in the release of one or more relays RF one after the other in the range of the control advance leading to energization of the corresponding relays RS*t*. If the relay RS*t* of the end stop would be among them, the relay RW would be released limiting the speed to the first speed step and preparing the braking. As, however, it is assumed that the marking member of the end stop is not in the range of the control advance relay RW is not released. Consequently, relay RG2 may be energized so that the acceleration through closing of the contact K2G2 is liberated to the second speed step. Simultaneously, the braking advance associated so the second speed step and produced by the potential division between resistance W52 and potentiometers P6 and P5 becomes active.

After a further acceleration the speed level determinated by potentiometer P9 is reached and relay RG31 is energized. This leads to opening of contact K1G31 so that the control advance associated to the third speed step and produced by the potential division between the resistance W51 and the potentiometer P4, P3 and P2 constantly decelerated by means of resistance W89 and capacitor C12 is superimposed on the actual voltage of the cabin position. By the application of this control advance, the floor discriminator is advanced resulting in the release of one or more relays RF one after the other in the range of the control advance leading to energization of the corresponding relays RS*t*. If the critical relay of the end stop would be among this range, the relay RW would be released. As, however, it is assumed that this is not the case, the relay RW remains energized. Thus, relay RG3 may be energized so that the acceleration to the third speed step is liberated through closure of contact K2G3. Simultaneously the braking advance associated with the third speed step and produced by the potential division between the resistance W52 and the potentiometers P7, P6 and P5 becomes active. As the end speed is attained, the acceleration is completed and the elevator travels at this higher speed until the control advance actuates the corresponding relay RF and thus the marking member, i.e. the relay RS*t* of the end stop thereby preparing the braking which is initiated shortly afterwards.

In the described embodiment, upon operation of the floor discriminator as a generator, information is received as to whether the cabin is at the determinated floor or not. By appropriate selection of the information element RF in the steps of this discriminator there may additionally be obtained the information necessary for the elevator control as to whether the cabin is beneath or above the considered floor. This may in the present example be obtained by replacing the normal relay RF by a polarized relay.

In the electrical analog technique, electrical analogy values are associated with any physical values and the desired operations are then effected by the analog values. In the represented example direct potentials have been associated as reference values for the distances which have to be covered by the elevator. It is to be understood that the reference values may also be others such as, for example, A.C. potentials, phase angles, etc.

I claim:

1. In an elevator control system which includes an analog control device for indicating the level of an elevator cabin, a motor for moving said elevator cabin and a brake for braking the movement of said elevator cabin, further control apparatus comprising: first means for generating an actual voltage representative of the actual position of said elevator cabin including a first direct-current source having positive and negative terminals wherein said negative terminal is grounded, a first potentiometer connected across said terminals of said first source and including a slider mechanically connected to said analog control device and electrically connected to a first lead; second means for generating nominal voltages representing nominal floor levels of said elevator cabin, comprising a plurality of serially connected resistors and a second potentiometer connected between the terminals of said first direct-current source and including outputs tapped to the junctions of said resistors and potentiometer; a second direct-current source including positive and negative terminals and a reversing relay means including inputs connected to said terminals and a pair of outputs whereby the voltage polarity across said outputs changes as the state of the reversing relay means changes; second means for generating a braking advance voltage responsive to the running characteristics of said elevator cabin; breaking discriminator means for comparing the sum of the actual voltage and the breaking advance voltage with the nominal voltage of the desired stop level to generate a digital control for controlling said brake; third means for generating control advance voltages responsive to the speed and direction of travel of said elevator cabin including three adjustable resistors and a first fixed resistor connected in series, means for connecting the free end of said first fixed resistor to one of the outputs of said reversing relay means, means for connecting the free end of the outermost variable resistor to said first lead, selectively actuatable short circuiting means for short circuiting the resistance of the other two variable resistors, and output means for connecting said resistors to a second lead for transmitting the sum of the actual voltage and a control advance voltage; a coupling resistor including one end connected to said second lead; a capacitor for electrically coupling the other end of said coupling resistor to the slider of said first potentiometer; and a plurality of floor discriminators each associated with a different floor; each of said floor discriminators comprising a twin-triode, each triode section including an anode, a cathode and a grid; means for connecting said other end of said coupling resistor to the grids of one of the triode sections of each of said twin-triodes; means for connecting the grids of the other triode sections of said twin-triodes to the outputs of said second means whereby each of said latter grids receives a nominal voltage indicative of a different floor level; means for connecting the anodes of said triode sections to the positive terminal of said first direct-current source, resistor means for separately connecting each of the cathodes to the negative terminal of said first direct-current source; and a relay means connected between the cathodes of each twin-triode.

2. The system of claim 1 further including means responsive to said motor for generating an actual speed voltage representative of the actual speed of travel of said elevator cabin; a source of nominal speed voltages comprising a third potentiometer, said third potentiometer connected across the terminals of said first direct-current source and including a variable tap; and a speed discriminator comprising a twin-triode wherein each triode section includes a cathode, a grid and an anode, means for connecting said cathodes together, first resistor means for connecting said cathodes to the negative terminal of said first direct-current source, means for connecting the grid of said first section to the variable tap of said third potentiometer, second resistor means for connecting the anode of said first section to the positive terminal of said first direct-current source, means for connecting the grid of said second section to said means for generating the actual speed voltage, relay means including a coil and a contact set, said coil connected between the anode of said second triode section and the positive terminal of said first direct-current source, said contact set being one of the selectively actuatable short circuiting means of said means for generating control advance voltages.

3. In an elevator control system which includes an analog control device for indicating the level of an elevator cabin, a motor for moving said elevator cabin, and a brake for braking the movement of said elevator cabin, further control apparatus comprising: means for generating different nominal position indication voltages respectively related to different floor levels including selectively actuatable contact means for transmitting position indicating voltages related to stop floor levels, means responsive to said analog control device for generating an actual position indicating voltage representing the level of said elevator cabin; means for generating a control advance voltage representing the speed and direction of elevator cabin travel; means for adding said control advance voltage to one of said position indicating voltages to provide a superimposed voltage; means for comparing said superimposed voltage and one of said nominal position indicating voltages for providing a digital control for elevator control system; braking advance voltage generating means including a source of direct-current voltage and a voltage divider connected to said source of direct-current voltage, said voltage divider including three serially connected variable resistors and a fixed resistor, two controllably actuatable short circuit means for selectively short circuiting two of said variable resistors, and an output connected to said serially connected resistors; means for connecting said voltage divider to said actual position indicating voltage generating means whereby the output of said voltage divider is a summed voltage of said braking advance voltage and said actual position indicating voltage; and a braking discriminator including a twin-triode wherein each section of said twin-triode includes an anode, a cathode and a grid, relay means connected across said anodes for energizing said brake, a source of operating potentials, first and second resistor means for connecting said anodes to said source of operating potentials, means for connecting said cathodes together, third resistor means for connecting said cathodes to said source of operating potentials, means for connecting the grid of the first section to the output of said voltage divider and means for connecting the grid of said second section to the contact means of said actual position indicating voltage generating means.

References Cited in the file of this patent

UNITED STATES PATENTS

| | | |
|---|---|---|
| 2,297,359 | Lewis et al. | Sept. 29, 1942 |
| 2,308,211 | Sanford | Jan. 12, 1943 |
| 2,597,586 | Keiper et al. | May 20, 1952 |
| 2,690,236 | Hancock et al. | Sept. 28, 1954 |